US008858724B2

(12) United States Patent
Black, Jr.

(10) Patent No.: US 8,858,724 B2
(45) Date of Patent: Oct. 14, 2014

(54) COLLAPSIBLE AND TRANSPORTABLE AUTOMATED CAR WASH

(71) Applicant: Nathaniel Black, Jr., Charlotte, NC (US)

(72) Inventor: Nathaniel Black, Jr., Charlotte, NC (US)

( * ) Notice: Subject to any disclaimer, the term of this patent is extended or adjusted under 35 U.S.C. 154(b) by 0 days.

(21) Appl. No.: 13/756,673

(22) Filed: Feb. 1, 2013

(65) Prior Publication Data

US 2013/0199568 A1    Aug. 8, 2013

Related U.S. Application Data

(60) Provisional application No. 61/594,448, filed on Feb. 3, 2012.

(51) Int. Cl.
*B08B 3/02* (2006.01)
*B08B 1/02* (2006.01)
*B60S 3/04* (2006.01)
*B60S 3/00* (2006.01)

(52) U.S. Cl.
CPC ...... *B60S 3/04* (2013.01); *B60S 3/00* (2013.01)
USPC .................................. 134/34; 134/18; 134/32

(58) Field of Classification Search
None
See application file for complete search history.

(56) References Cited

U.S. PATENT DOCUMENTS

| 1,183,391 | A | * | 5/1916 | Mason | 134/123 |
| 2,000,205 | A | * | 5/1935 | Wickstrum | 135/98 |
| 3,108,804 | A | * | 10/1963 | Wagner | 473/504 |
| 3,353,546 | A | * | 11/1967 | Mahoney | 134/123 |
| 5,511,572 | A | * | 4/1996 | Carter | 135/145 |
| 5,797,994 | A | * | 8/1998 | Rasmussen | 134/10 |
| 2009/0188535 | A1 | * | 7/2009 | Taylor et al. | 134/104.2 |
| 2009/0217944 | A1 | * | 9/2009 | Munera et al. | 134/6 |

* cited by examiner

*Primary Examiner* — Nicole Blan
(74) *Attorney, Agent, or Firm* — Hammer & Associates, P.C.

(57) ABSTRACT

A collapsible and transportable automated carwash includes a bay with a collapsible frame. The collapsible frame has a plurality of collapsible cross-members. The collapsible cross-members are on the bottom and top of the frame connecting the left side of the collapsible frame to the right side of the collapsible frame. The plurality of collapsible cross-members allows the collapsible frame to collapse and reduce the width of the carwash. Whereby, the collapsible and transportable automated carwash is transportable.

10 Claims, 14 Drawing Sheets

COLLAPSIBLE AND TRANSPORTABLE AUTOMATED CAR WASH

RELATED APPLICATION

This application claims the benefit of provisional application Ser. No. 61/594,448 filed Feb. 3, 2012.

FIELD OF THE INVENTION

The present invention relates generally to automated or automatic car washes. More particularly, the present invention relates to a collapsible and transportable automated car wash.

BACKGROUND OF THE INVENTION

A car wash or auto wash is a facility used to clean the exterior and, in some cases, the interior of motor vehicles. While there are many different types of car washes, most fall into the following categories: hand car wash facilities, self-service facilities, tunnel washes, and in-bay automated or automatic car washes. Hand car wash facilities are facilities where the vehicle is washed by employees. Self-service facilities, on the other hand, are facilities which are generally coin-operated, where the customer does the washing. Tunnel washes use a conveyor to move the vehicle through a series of fixed cleaning mechanisms. In-bay automatics or automated car washes consist of an automatic machine that rolls back and forth over a stationary vehicle. The instant invention is directed to an in-bay automated car wash that is collapsible and transportable.

In-bay automatics are often seen at filling stations and stand-alone wash sites. Currently, there are no known collapsible and/or transportable automated carwashes. However, there is a need to provide an automated car wash at different locations, events, etc. at different times. For example, many organizations and charities, like schools, host car wash fund raisers, where the organization washes cars to raise money. These types of fund raisers help raise money for books, supplies, trips, sporting equipment, etc. These fund raisers are typically done by the organization manually washing cars at the organizations facilities, like on school property. This requires numerous volunteers and countless hours of labor to raise money. There is clearly a need to reduce the amount of volunteers needed and hours of labor used to hold a car wash fund raiser for an organization. Furthermore, there are numerous other instances where a collapsible and/or transportable automatic carwash may be desired and/or needed, including, but not limited to, apartment complexes, construction sites, office parks, etc.

The instant invention is designed to address the problems described above and provide a transportable collapsible automated carwash.

SUMMARY OF THE INVENTION

The instant invention is directed toward a collapsible and transportable automated carwash. The collapsible and transportable automated carwash includes a bay with a collapsible frame. The collapsible frame has a plurality of collapsible cross-members. The collapsible cross-members are on the bottom and top of the frame connecting the left side of the collapsible frame to the right side of the collapsible frame. The plurality of collapsible cross-members allows the collapsible frame to collapse and reduce the width of the carwash. Whereby, the collapsible and transportable automated carwash is transportable.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
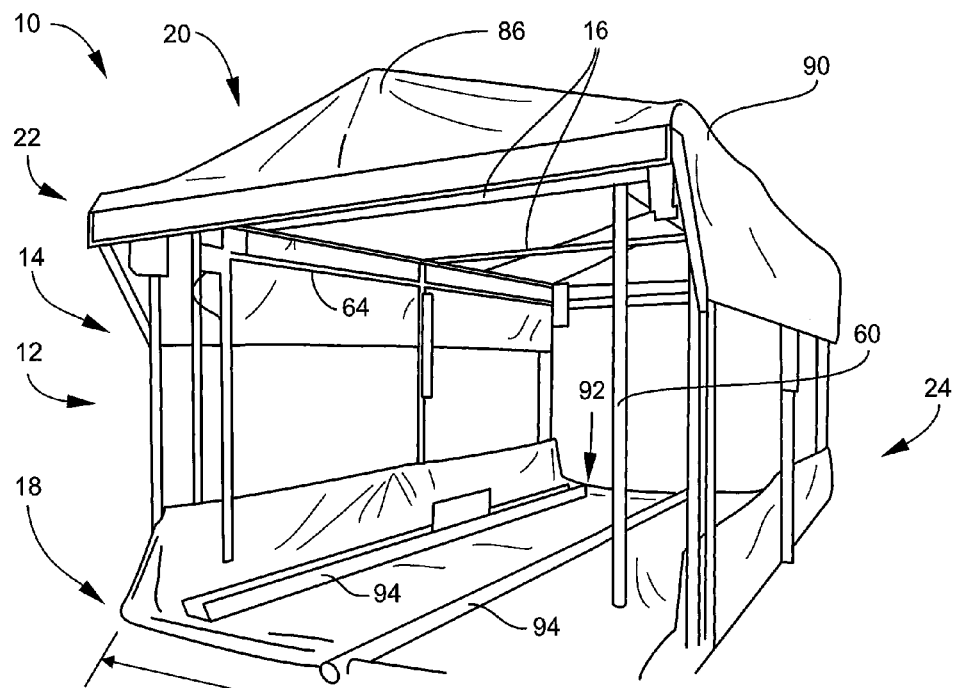
FIG. 1 is a perspective view of the collapsible and transportable automated car wash according to one embodiment of the instant invention.
Figure 2:
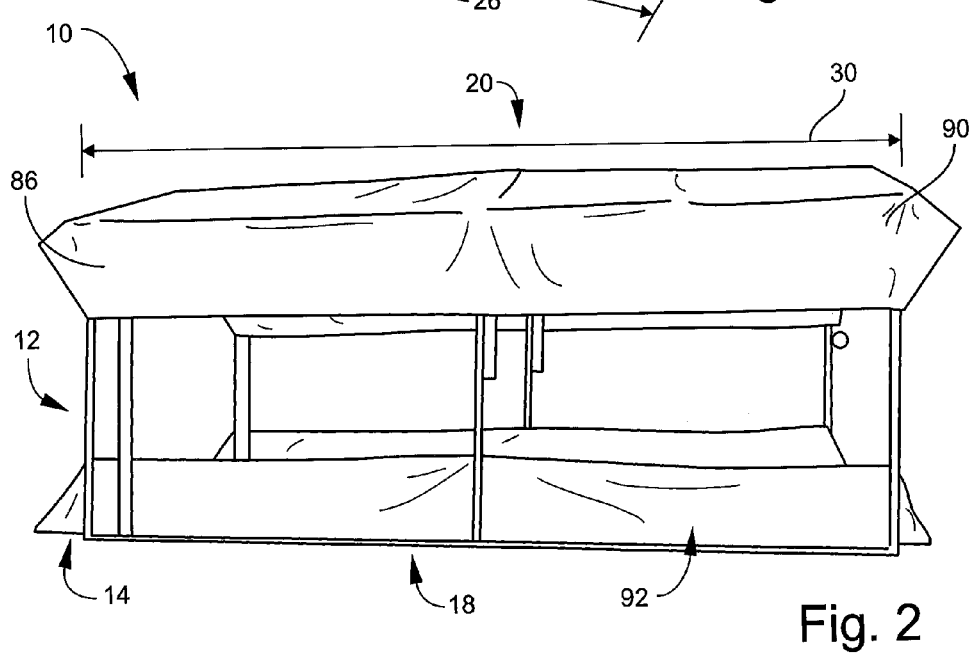
FIG. 2 is a side elevational view of the collapsible and transportable automated car wash shown in FIG. 1.
Figure 3:
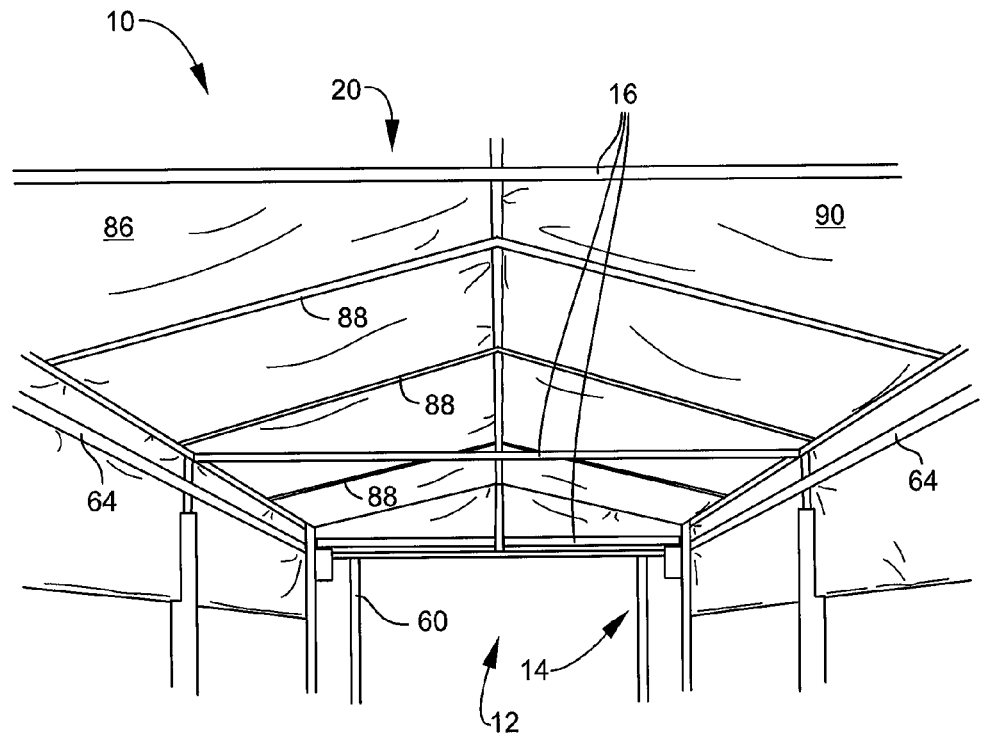
FIG. 3 is a perspective view from inside the collapsible and transportable automated car wash shown in FIG. 1 showing one embodiment of the top according to the instant invention.
Figure 4:
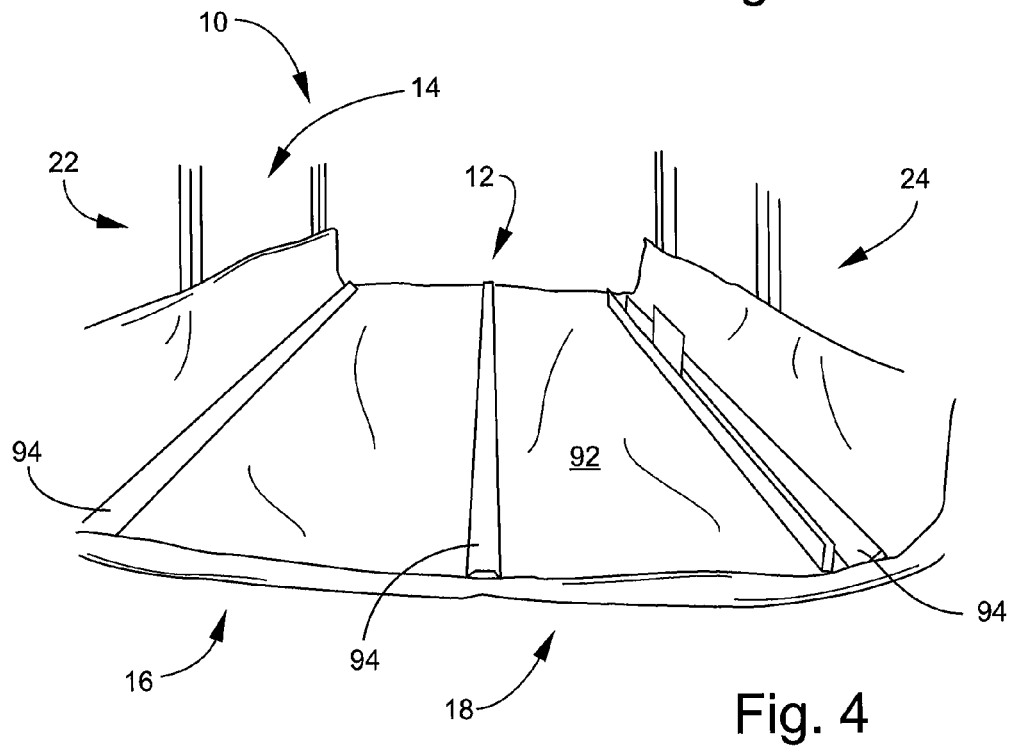
FIG. 4 is a perspective view from inside the collapsible and transportable automated car wash shown in FIG. 1 showing one embodiment of the bottom according to the instant invention.
Figure 5:
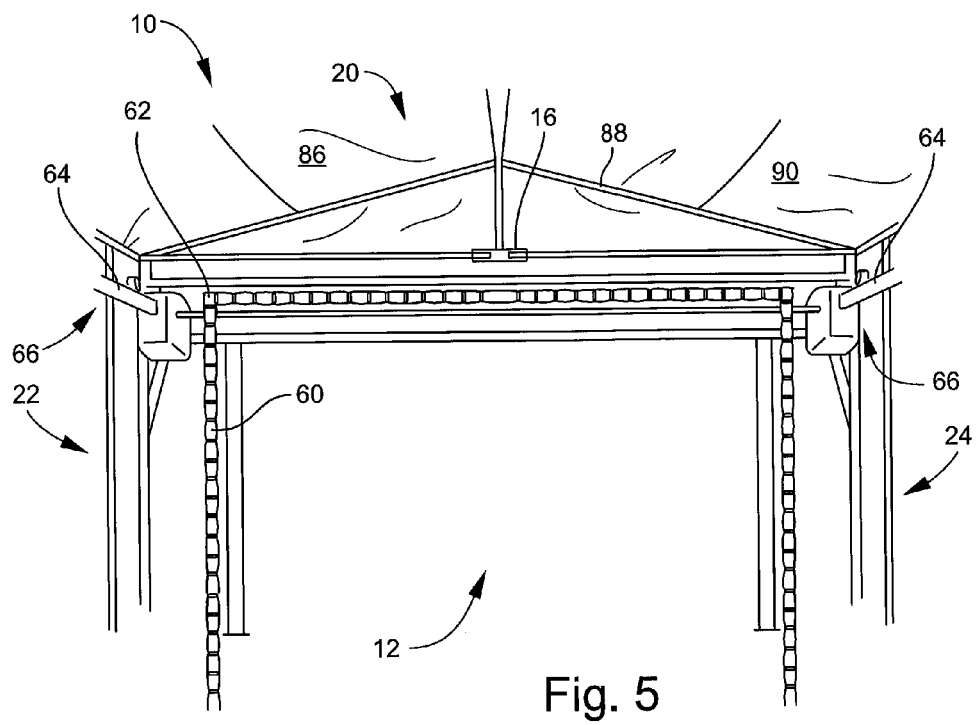
FIG. 5 is a perspective view showing the automated sprayer according to one embodiment of the instant invention.
Figure 6:
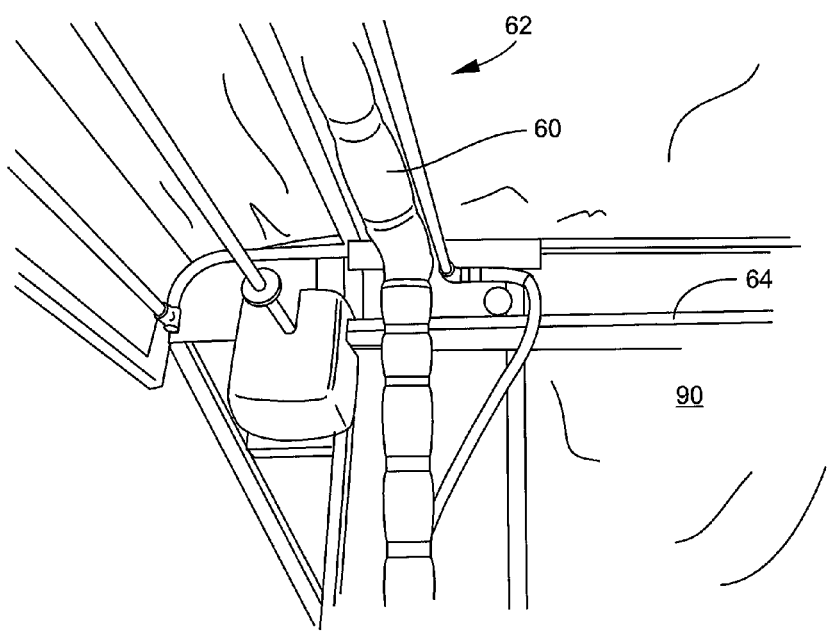
FIG. 6 is a perspective view showing the sprayer track according to one embodiment of the instant invention.
Figure 7:
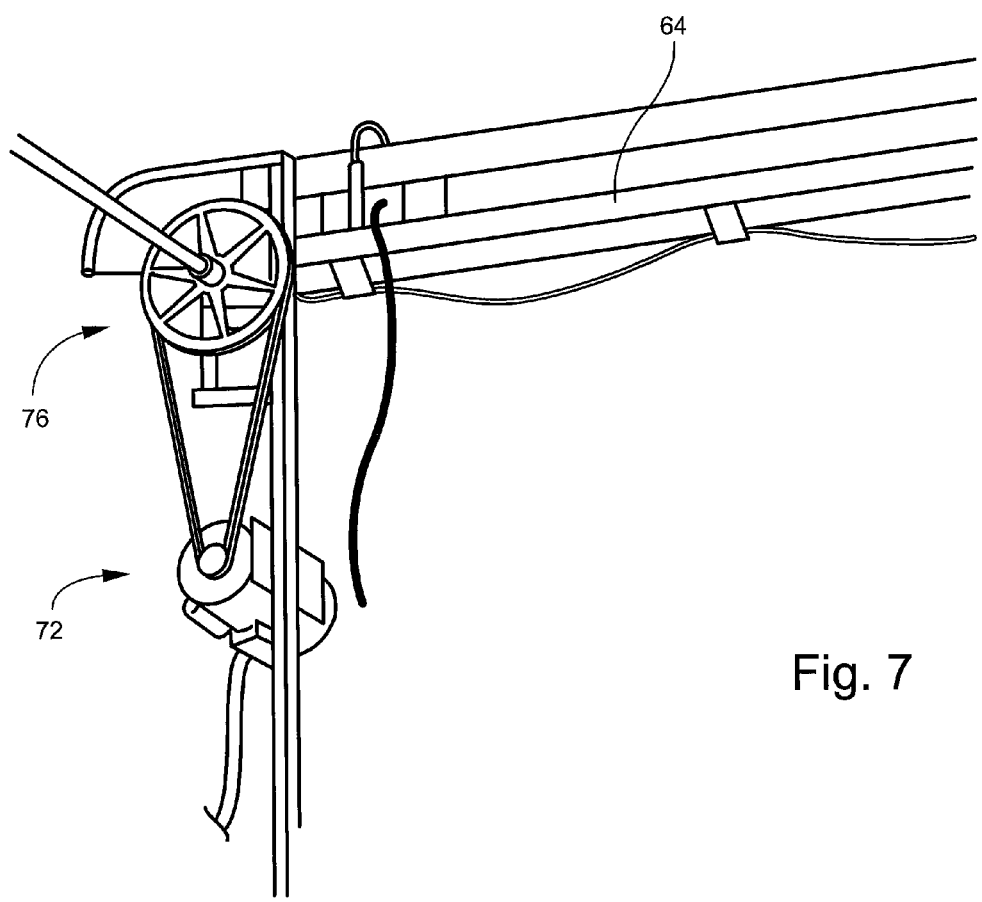
FIG. 7 is a perspective view of the motor with the belt and pulley system according to one embodiment of the instant invention.
Figure 8:
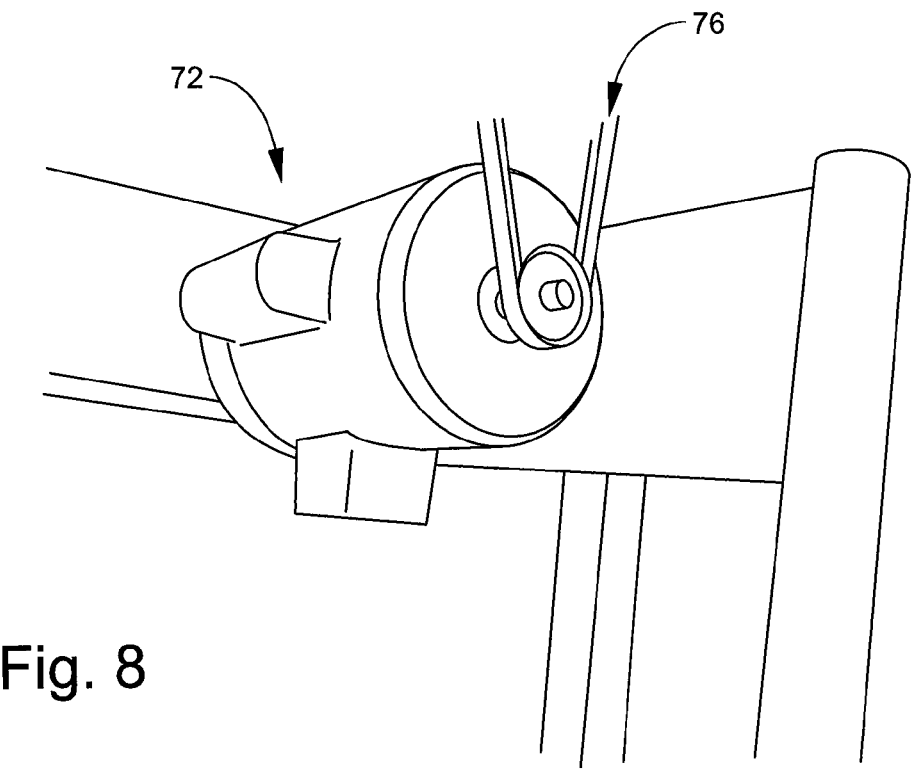
FIG. 8 is a zoomed in perspective view of the motor with the belt and pulley system shown in FIG. 7.
Figure 9:
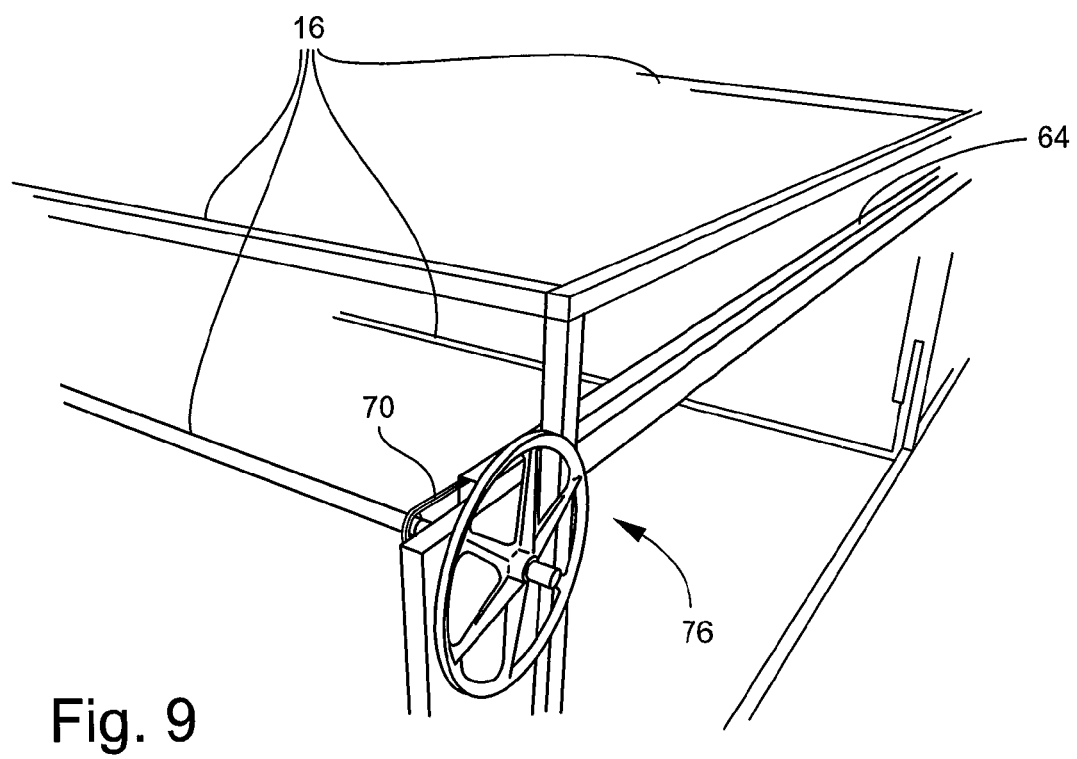
FIG. 9 is a perspective view of the pulley for the sprayer track motion according to one embodiment of the instant invention.
Figure 10:
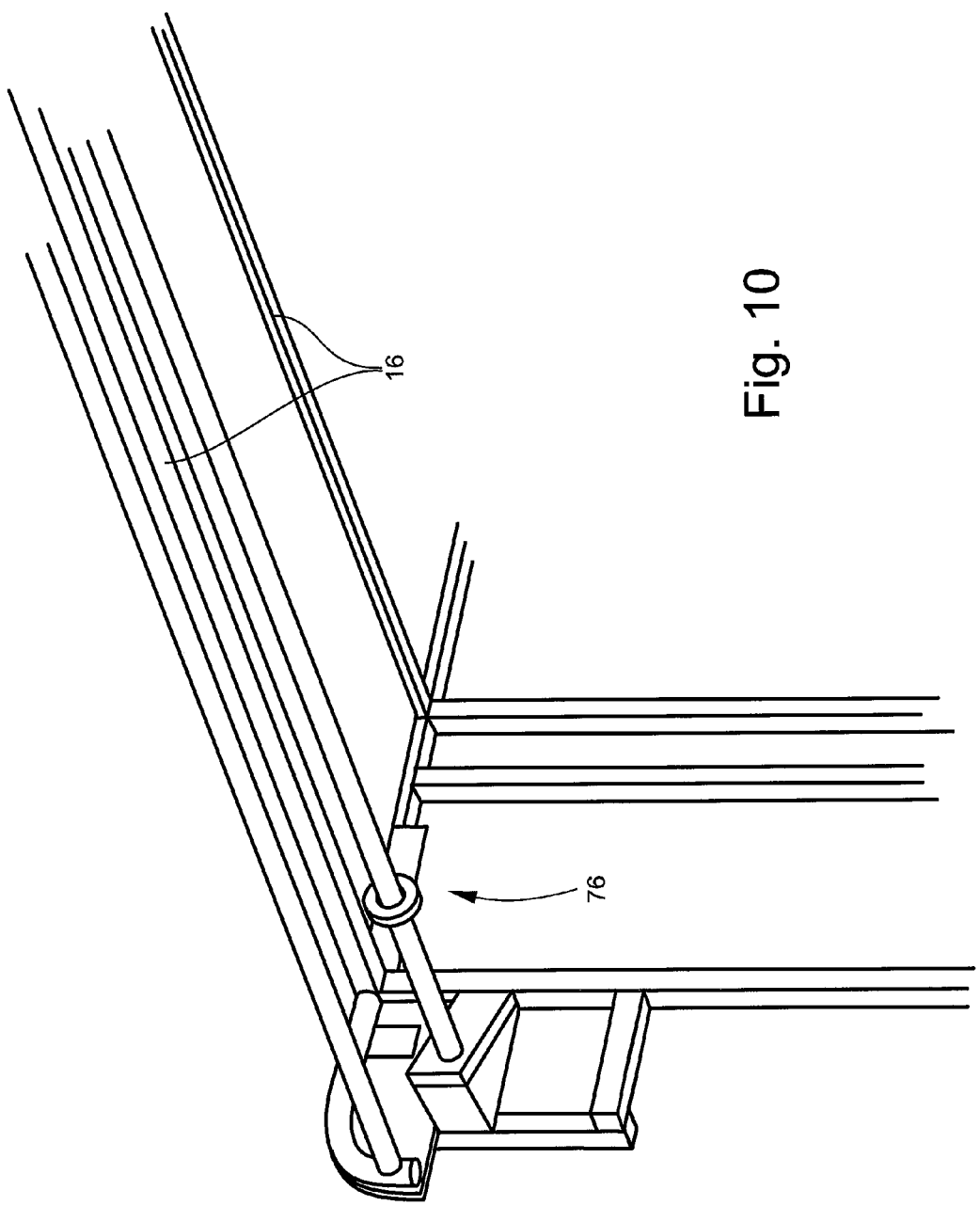
FIG. 10 is another perspective view of the pulley for the sprayer track motion according to one embodiment of the instant invention.
Figure 11:
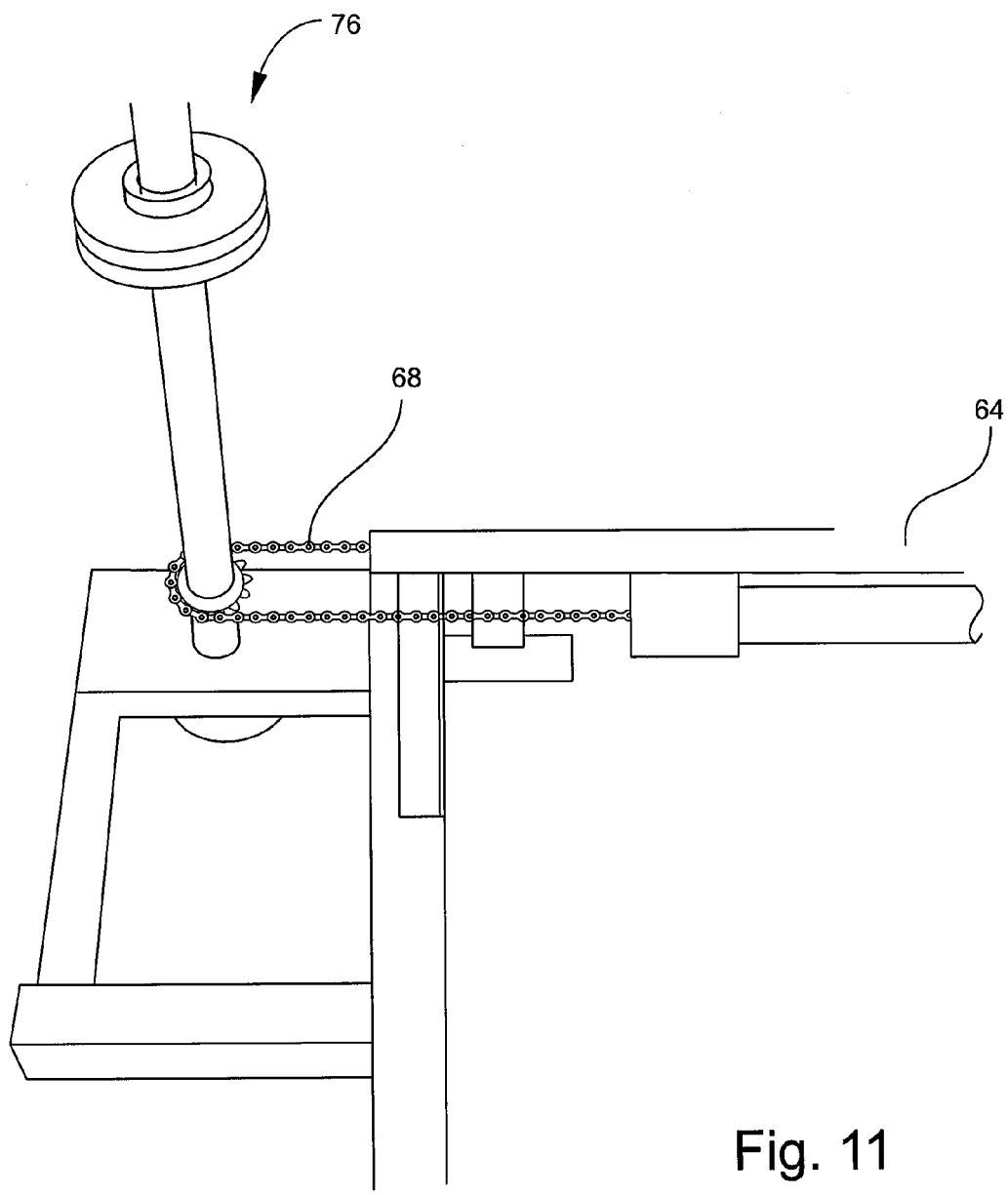
FIG. 11 is a perspective view of the sprayer track chain and gears connected to the pulley system according to one embodiment of the instant invention.
Figure 12:
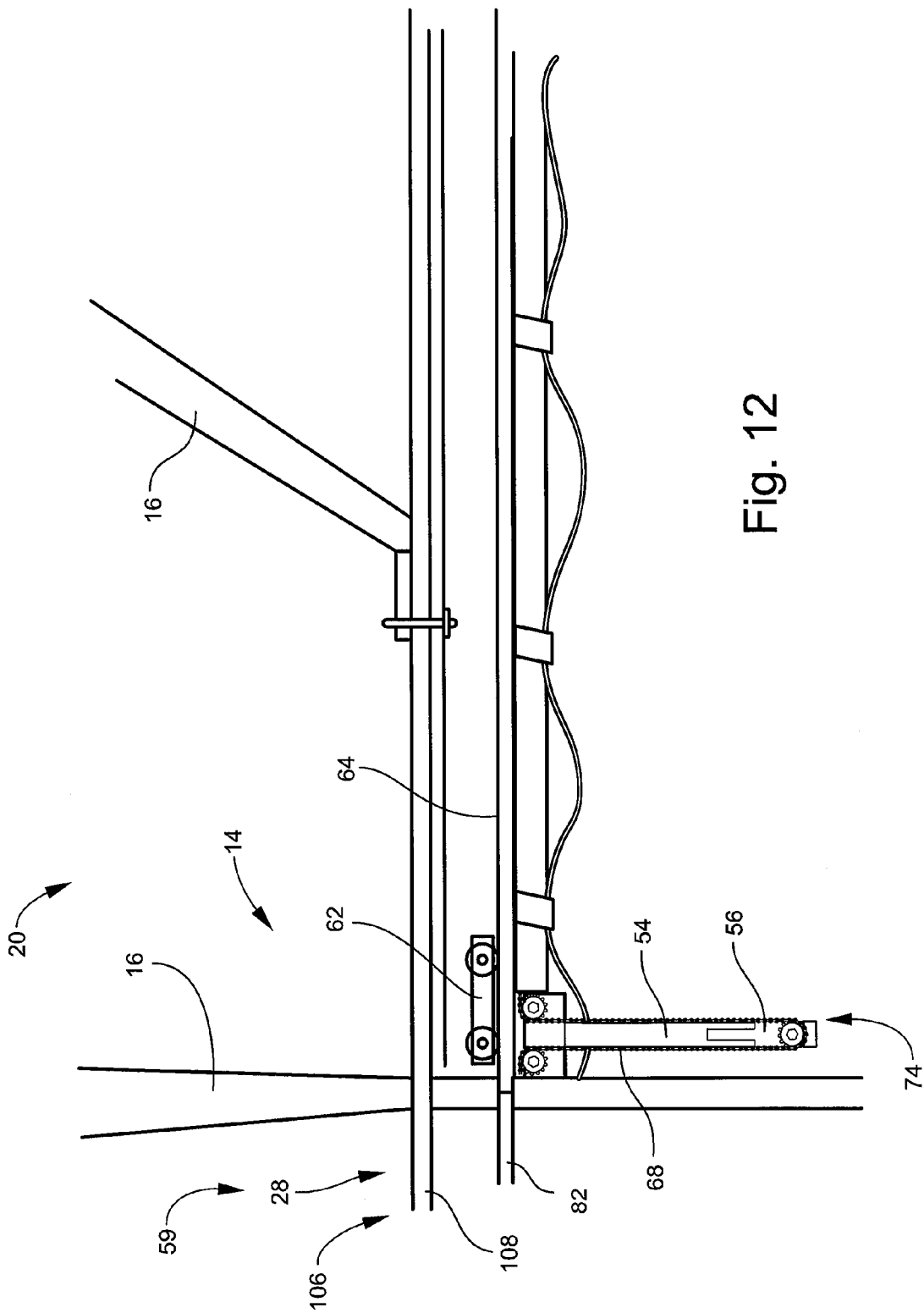
FIG. 12 is a perspective view of the spring tension section of the sprayer track according to one embodiment of the instant invention.

Referring to the drawings, wherein like numerals indicate like elements, there is shown in FIG. 1 an embodiment of a collapsible and transportable automated carwash 10. Collapsible and transportable automated carwash 10, also referred herein as just carwash 10, may be for washing a car at any location, including a remote location. Carwash 10 may operate as a standard in-bay automatic carwash with an automatic machine that rolls back and forth over a stationary vehicle. In addition, carwash 10 may include the added benefit of being collapsible and thereby transportable to various destinations or locations. Thus, the automated carwash 10 of the instant invention may be adapted to be transportable. The carwash being transportable may mean that the automated carwash 10 can be collapsible enough to fit inside a truck or on top of a trailer, like a standard utility trailer. For instance, the automated carwash of the instant invention may be transported on a standard 6 foot by 16 foot utility trailer. Thus, carwash 10 may be utilized at various events and locations including but not limited to, charity fundraisers, apartment locations, construction sites, office parks, the like, etc., or any other destinations or locations requiring or desiring an automated carwash.

The collapsible and transportable automated carwash 10 may include a bay 12. See FIGS. 1-5. Bay 12 may be the space inside the carwash where the vehicle or car may be positioned for washing. Bay 12 may be any size, including a size adapted to fit most personal and/or commercial vehicles, cars, trucks, boats, etc. Bay 12 may be sized as with any standard in-bay automatic carwash.

A collapsible frame 14 may be included in the collapsible and transportable automated carwash 10 of the instant invention. See FIGS. 1-4. The collapsible frame 14 may be for reducing the size of carwash 10 for allowing the carwash 10 to be transportable. For example, collapsible fame 14 may reduce the size of carwash 10 so that it may fit inside a truck or on top of a trailer, including, but not limited to, a standard 6 foot by 16 foot utility trailer. The collapsible frame 14 may include any number of various members or components that may allow the carwash to be reduced in size for transportation. In one embodiment, the collapsible frame 14 may include a plurality of collapsible cross-members 16 for reducing the width 26 of the carwash. In other embodiments, the collapsible frame may include a collapsible length section 28 or multiple collapsible length sections 28 for reducing the length 30 of the carwash.

The collapsible cross-members 16 may be included in the collapsible frame 14 of carwash 10. See FIGS. 1, 3, 5, 9, 10, 12, 14, 16 and 17. Collapsible cross-members 16 may be for reducing the width 26 of carwash 10 to make the carwash transportable. Collapsible cross-members 16 may reduce the width 26 by any amount to make carwash 10 transportable, including, but not limited to, reducing the width 26 to fit inside a truck or on top of a trailer. For example, collapsible cross-members 16 may reduce the width 26 of the carwash 10 to 6 feet or less so that carwash 10 may fit on a standard 6 foot by 16 foot utility trailer. The collapsible cross-members 16 may be on the bottom 18 and/or top 20 of the collapsible frame 14. The collapsible and transportable automated carwash 10 may include any number of collapsible cross-members 16 on the top 20 and/or bottom 18 of collapsible frame 14. As one skilled in the art readily understands, the amount of collapsible cross-members 16 on the top 20 and/or bottom 18 of collapsible frame 14 may vary based on the strength and weight of the materials used for collapsible frame 14 and the desired and/or required sturdiness of the carwash.

The collapsible cross-members 16 may connect the left side 22 of the collapsible frame 14 to the right side 24 of the collapsible frame 14. See FIGS. 16-17. In one embodiment, each of the collapsible cross-members 16 may include: a right cross-member 36 pivotally connected to the right side 24 of the collapsible frame 14 on one end and pivotally connected to a left cross-member 38 on its other end; a left cross-member 38 pivotally connected to the left side 22 of the collapsible frame 14 on one end and pivotally connected to the right cross-member 36 on its other end. See FIGS. 16-17. The pivotal connections of collapsible cross-members 16 may be any pivotal connections including, but not limited to, a pin, a screw, various joints, various hinges, a rivet, the like, other pivotal connections, and combinations thereof. In one embodiment, the collapsible cross-members 16 may be in an extended width position 40 when the right cross-member is approximately at an angle 42 being approximately 180 degrees to the left cross-member 38, and the collapsible cross-members 16 may be in a collapsed width position 44 when the right cross-member 36 being at an angle 46 being less than 180 degrees to the left cross-member 38. As one skilled in the art should readily understand, the more the collapsible cross-members 16 are bent towards each other thereby further reducing angle 46 from 180°, the more the width 26 of collapsible frame 14 may be reduced. Collapsible cross-members 16 may be adapted to allow the collapsible frame to collapse and reduce the width 26 of the collapsible fame 14 and/or the carwash bay 12. For instance, the width 26 may be reduced to less than 6 feet wide in order for the carwash to be transported on a standard 6 foot wide trailer. In one embodiment, to facilitate the reduction in the width of carwash 10 and the collapse of the collapsible cross-members 16, one may add wheels and or low-friction devices to the bottom of collapsible frame 14. In such embodiments where the collapsible frame is on wheels or has low-friction devices on the bottom, the carwash 10 may need to be secured in place when operated, like by wheel locks, stakes or other similar devices.

Each of the collapsible cross-members 16 may be adapted to lock into the extended width position 40. See FIG. 16a. The collapsible cross-members 16 may be adapted to lock into the extended position by any means. In one embodiment, each of the collapsible cross-members 16 may be adapted to lock into the extended position via a plurality of cross-member locks 48. Cross-member locks 48 may be any devices for locking the collapsible cross-members 16 into an extended position including, but not limited to, pop out pins, insertable pins, screws, other like devices, combinations thereof, and any other known or devices developed in the future capable of locking the collapsible cross-members 16 into an extended position.

The collapsible length section 28 or a plurality of collapsible length sections 28 may be included in the collapsible frame 14 of carwash 10. See FIGS. 12-15. Collapsible length section 28 may be for reducing the length 30 of carwash 10 to make the carwash transportable. Collapsible length section 28 may reduce the length 30 by any amount to make carwash 10 transportable, including, but not limited to, reducing the length 30 to fit inside a truck or on top of a standard utility trailer. In one embodiment, collapsible length section 28 may reduce the length 30 of the carwash 10 to 16 feet or less so that carwash 10 may fit on a standard 6 foot by 16 foot utility trailer. In another embodiment, collapsible length section 28 or multiple collapsible length sections 28 may reduce the length 30 of the carwash 10 to 12 feet or less.

Figure 13:
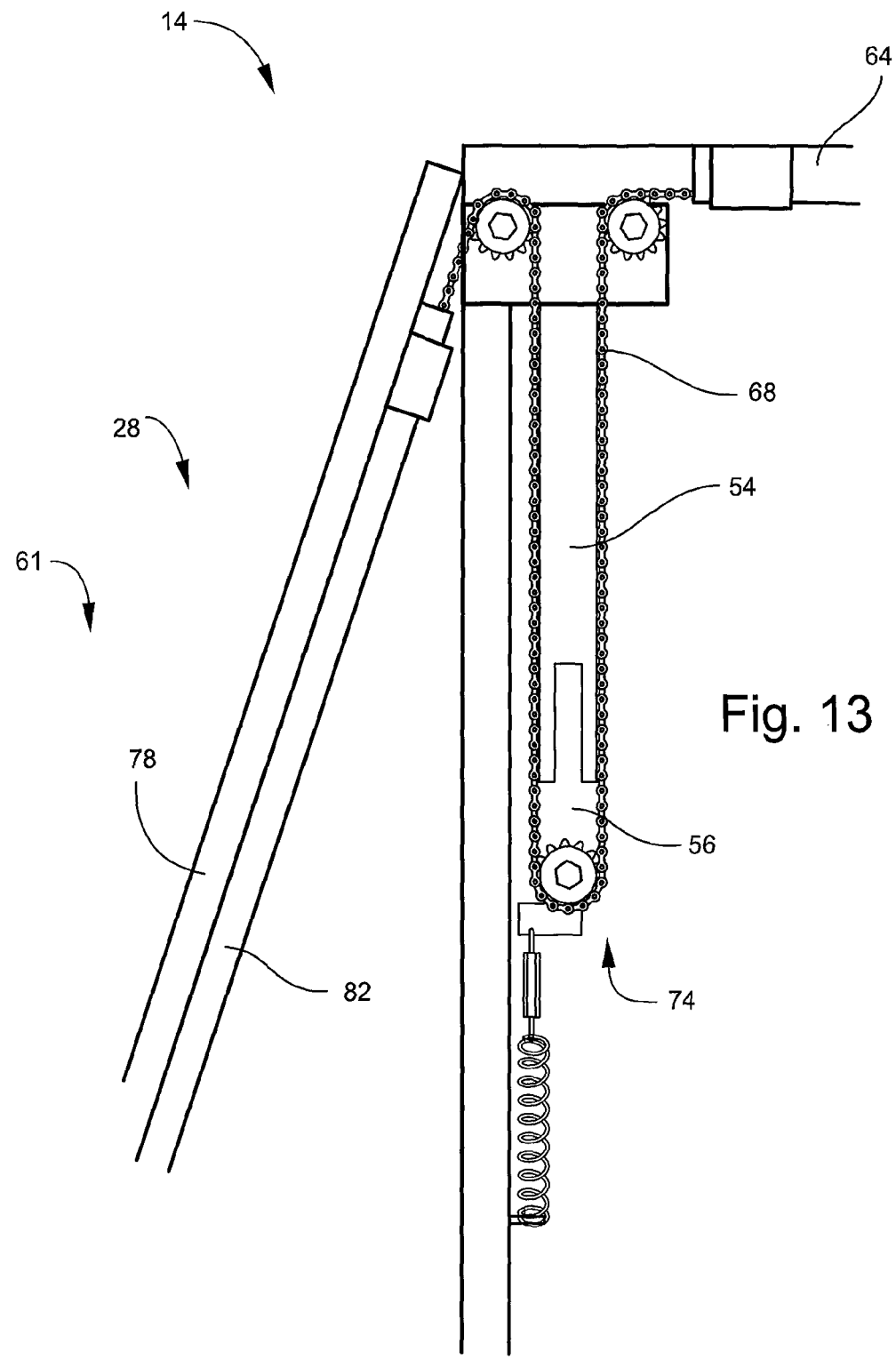
FIG. 13 is a side view of the spring tension section connected to the collapsible length section according to one embodiment of the instant invention.
Figure 14:
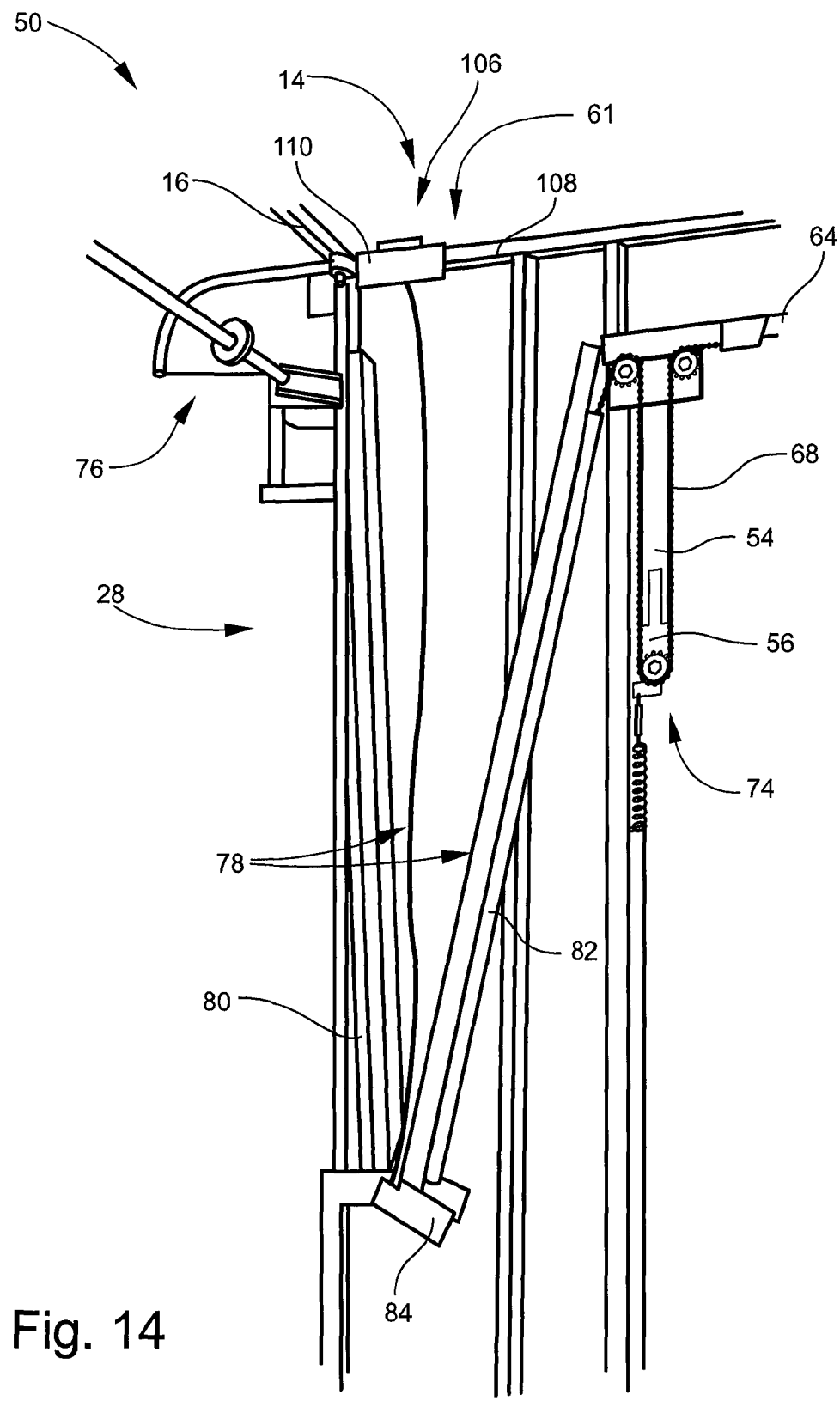
FIG. 14 is a perspective view of the collapsible length section in a collapsed position according to one embodiment of the instant invention.
Figure 15:
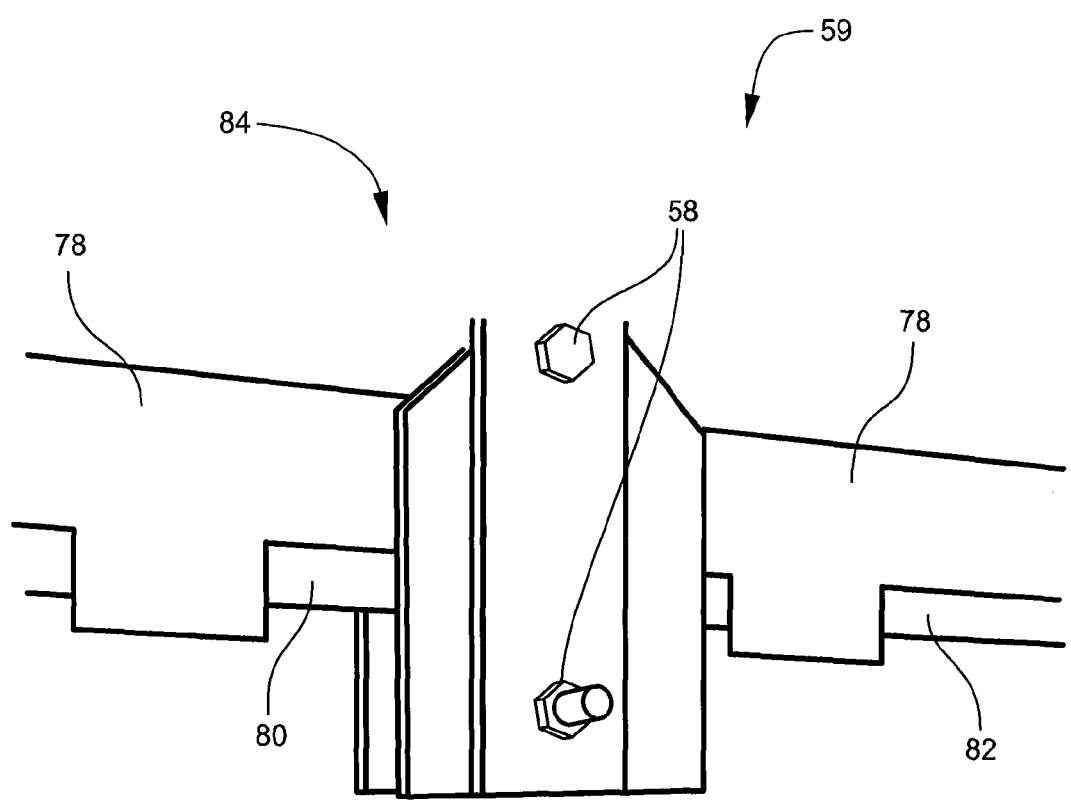
FIG. 15 is a perspective view of the collapsible connection of the collapsible length section according to one embodiment of the instant invention.
Figures 16A, 16B:
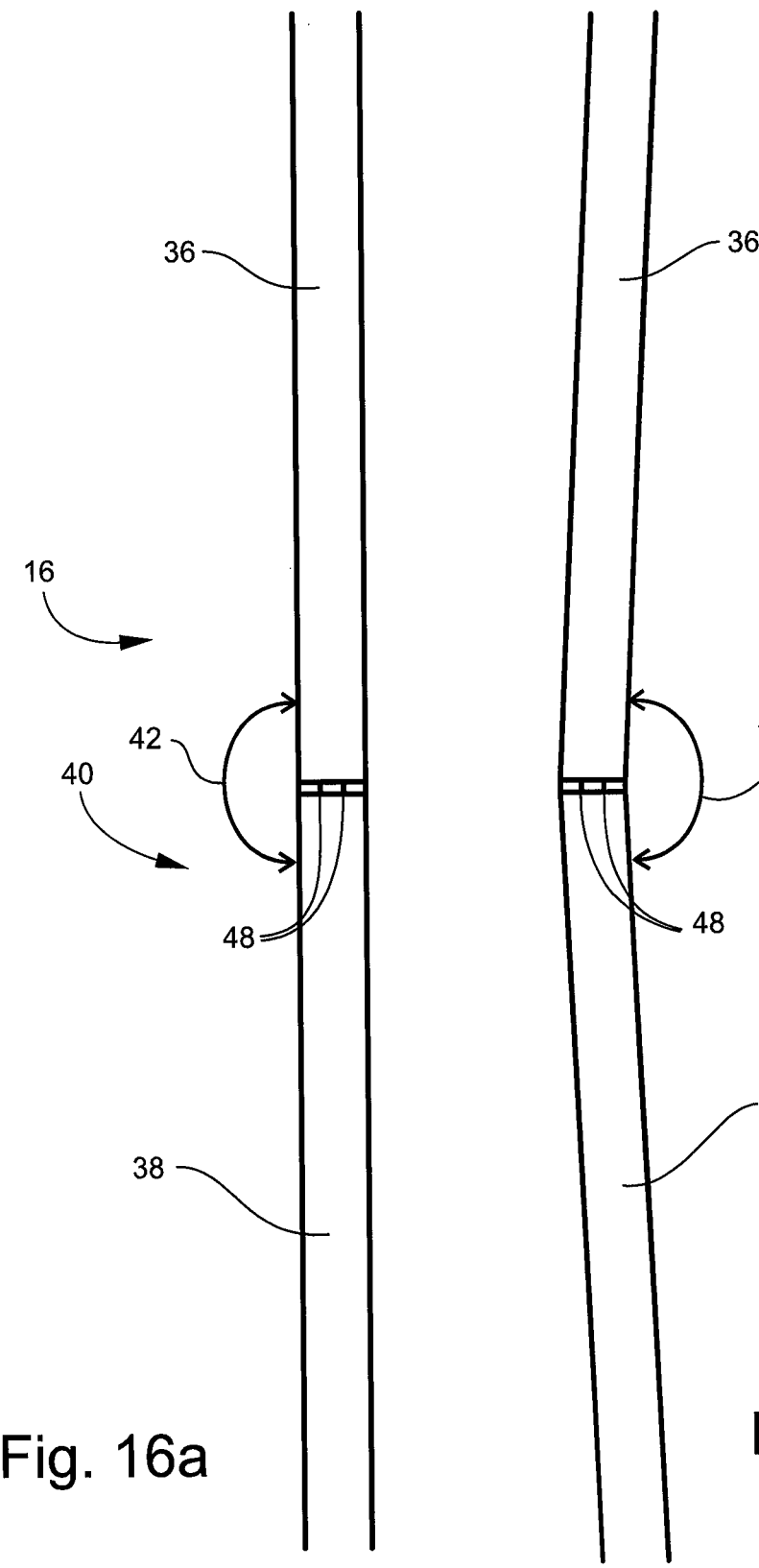
FIG. 16a is a top plan view of one of the collapsible cross-members in an extended position according to one embodiment of the instant invention.
FIG. 16b is a top plan view of one of the collapsible cross-members in a collapsed position according to one embodiment of the instant invention.
Figure 17:
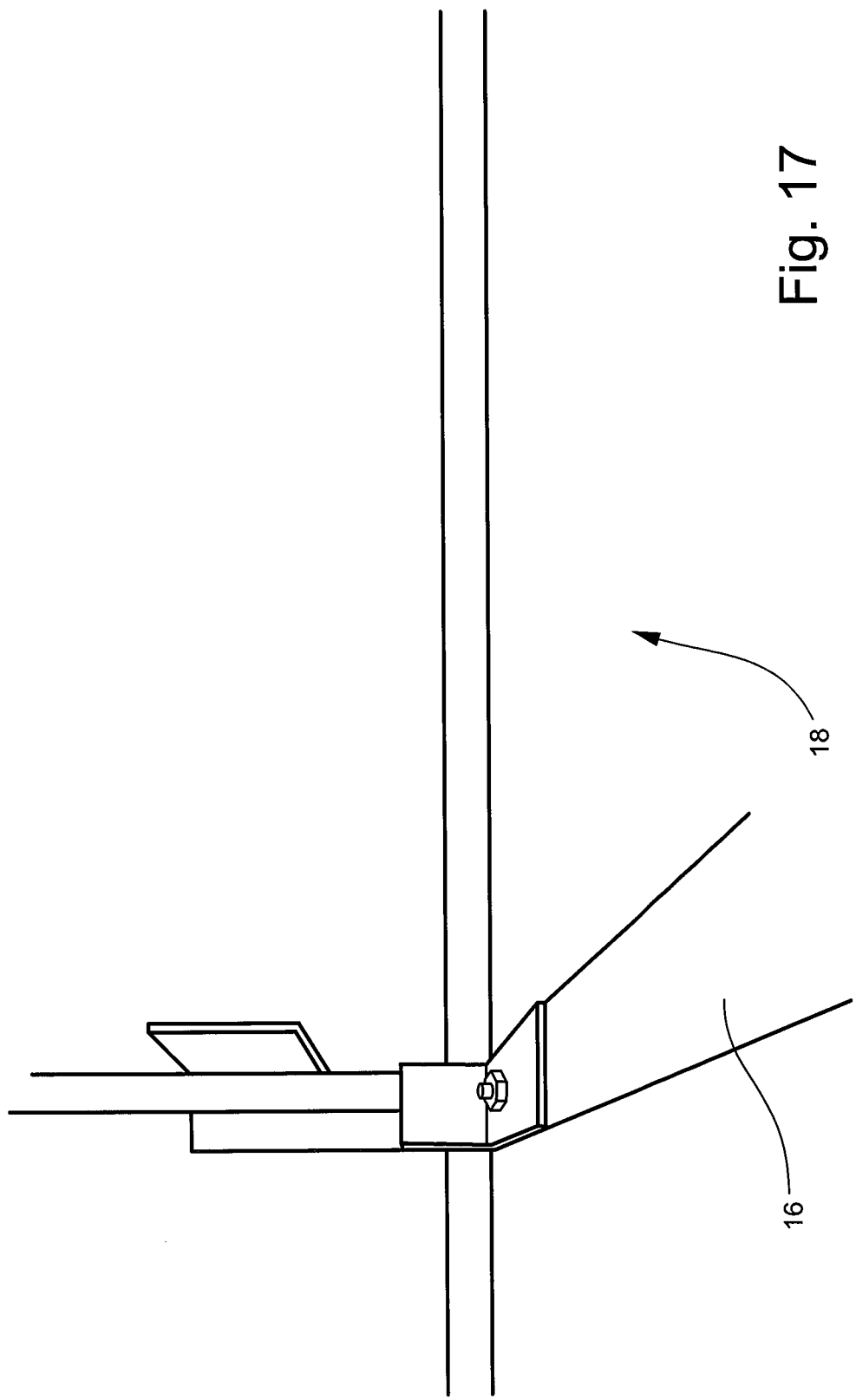
FIG. 17 is a perspective view of the collapsible cross member connection to the side of the collapsible frame according to one embodiment of the instant invention.

In one embodiment, the collapsible frame 14 may include a single pair of collapsible length sections 28 on each side of one end 50 of the collapsible frame (see FIGS. 13-15). The collapsible length section 28 may be on the left side 22 and right side 24 of the collapsible frame 14. Whereby, both sides 22 and 24 of collapsible length section 28 may be simultaneously collapsed for reducing the length 20 of carwash 10. In another embodiment, the collapsible frame 14 may include two or more pairs of collapsible length sections 28. For example, a pair of collapsible length sections 28 may be included on each end of the collapsible frame 14, or in various locations throughout the length 30 of carwash 10. The collapsible length section 28 or sections 28 may be adapted to allow the collapsible frame to collapse and reduce the length 30 of the carwash 10 and/or bay 12. For example, the length 30 may be reduced to less than 16 feet long in order for the carwash to be transported on a standard 16 foot long trailer. As another example, the length 30 may be reduced to less than 12 feet long.

The collapsible length sections 28 may be included on each side of the collapsible frame. In one embodiment, each of the collapsible length sections 28 may include a collapsible portion 78 with: a left portion 80 pivotally connected to the top 20 of collapsible frame 14 one end and pivotally connected to a right portion 82 on its other end; a right portion 82 pivotally connected to the top 20 of the collapsible frame 14 on one end and pivotally connected to the left portion 80 on its other end. See FIGS. 13-15. The pivotal connections between the collapsible portions 78 and the collapsible frame 14 may be any pivotal connections including, but not limited to, a pin, a screw, various joints, various hinges, a rivet, the like, other pivotal connections, and combinations thereof. In one embodiment, the collapsible length portion 78 may be in an extended length position 59 when the right portion 82 is approximately at 180 degrees to the left portion 80, and the collapsible portion 78 may be in a collapsed length position 61 when the right portion 82 is at an angle less than 180 degrees to the left portion 80. As one skilled in the art should readily understand, the more the collapsible portions 78 are bent towards each other thereby further reducing the angle from 180°, the more the length 30 of collapsible frame 14 may be reduced. FIG. 15 shows one embodiment of the collapsible connection 84 between the collapsible portions 78 of collapsible length section 28. Collapsible connection 84 may be adapted to allow the collapsible portions 78 to rotate relative to one another from 180° to less than 180°. In one embodiment, the collapsible connection 84 may allow the collapsible portions 78 to rotate relative to one another from 180° to approximately 0° relative to one another.

In addition to the collapsible portions 78, in one embodiment, the collapsible length sections may also include a plurality of telescoping length sections 106 at the top 20 and bottom 18 of the collapsible frame 14 within the collapsible length sections 28 for providing strength and rigidity to the collapsible frame 14, while also allowing the frame 14 to extend and decrease in length. Each of the telescoping length sections 106 may include a telescoping length right 108 telescopically connected to a telescoping length left 110. The collapsible and transportable automated carwash 10 may include any number of telescoping length sections 106 in or around the collapsible length sections 28. As one skilled in the art readily understands, the amount of telescoping length sections 106 may vary based on the strength of the materials used and the desired and/or required sturdiness of the carwash. Collapsible length sections 28 may be adapted to allow the collapsible frame to collapse and reduce the length 30 of the collapsible fame 14 and/or the carwash bay 12. For instance, the length 30 may be reduced to less than 16, or even 12 feet long in order for the carwash to be transported on a standard trailer.

Each of the collapsible length section 28 may be adapted to lock into an extended length position 59. See FIGS. 12 and 15. The collapsible length sections 28 may be adapted to lock into the extended length position 59 by any means. In one embodiment, each of the collapsible length sections 28 may be adapted to lock into the extended length position 59 via a plurality of collapsible length locks 58. Collapsible length locks 58 may be any devices for locking the collapsible length sections 28 into an extended length position 59 including, but not limited to, pop out pins, insertable pins, screws, other like devices, combinations thereof, and any other known or devices developed in the future capable of locking the collapsible length sections 28 into an extended length position 59.

The collapsible frame 14 may provide the carwash with any size length, width and/or height when expanded for receiving a car and washing the car. In one embodiment, the collapsible frame 14 may have an expanded length of 24 feet long. In another embodiment, the collapsible frame 14 may have an expanded width of 12 feet, 6 inches wide. In yet another embodiment, the collapsible frame 14 may have an expanded height of 9 feet, 6 inches. Along with the collapsible width and length, in one embodiment, the collapsible frame 14 may also include a collapsible height for reducing the height, like for transportation. The collapsible height may be done by any means, including, but not limited to telescoping legs or feet. In one embodiment the collapsible frame 14 may collapse from 9 feet 6 inches to approximately 8 feet.

Figure 18:
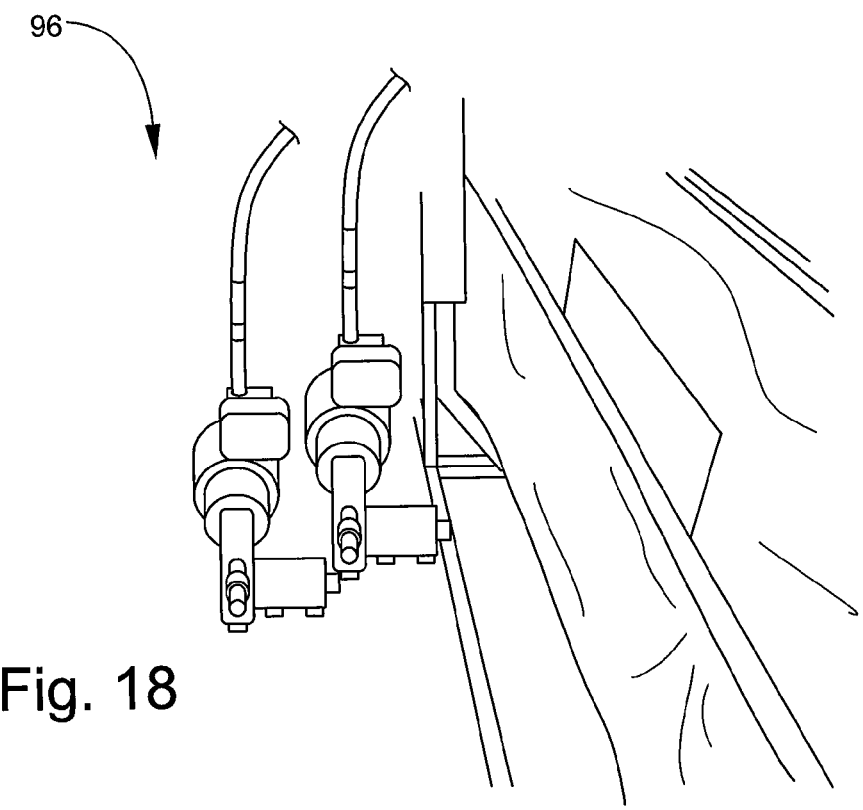
FIG. 18 is a perspective view of the pumps for the automated sprayer according to one embodiment of the instant invention.
Figure 19:
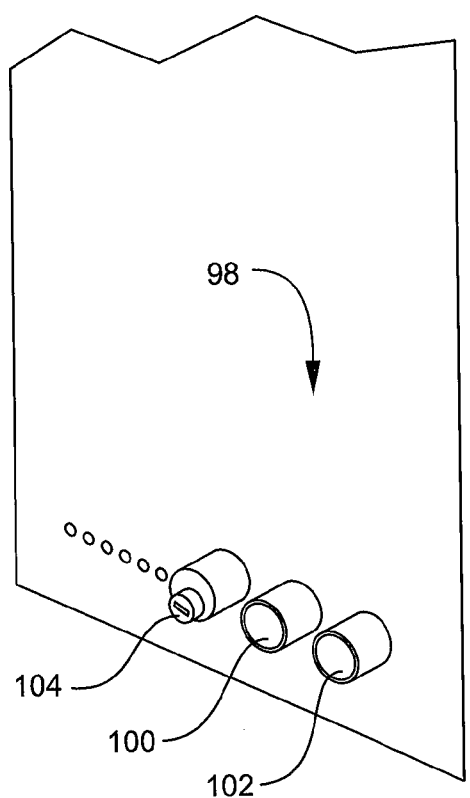
FIG. 19 is a perspective view of the controls for the carwash according to one embodiment of the instant invention.

A removable automated sprayer 60 may be included in the collapsible and transportable automated carwash 10 of the instant invention. See FIGS. 1, 3, 5 and 6. Automated sprayer 60 may be for washing a car. The automated sprayer 60 may be any known sprayer or any sprayer developed in the future capable of washing a car in a standard in-bay automatic carwash. In one embodiment, the automated sprayer 60 may be removably connected to a moveable cross-member 62. The moveable cross-member 62 may be connected to the top 20 of the collapsible frame 14 on each side and may be moved from the front of the carwash to the back of the carwash for washing the car. The moveable cross-member 62 may be moved across the top 20 of the collapsible frame 14 by any means. In one embodiment, the moveable cross-member 62 may be moved across the top 20 of the collapsible frame 14 via a sprayer track 64 on each side (left 22 and right 24) of the collapsible frame 14. The sprayer tracks 64 may be adapted to allow the moveable cross-member 62 to move from one end of the collapsible frame 14 to the other end of the collapsible frame. In one embodiment, the removable automated sprayer 60 may be connected to the moveable cross-member 62 by a plurality of quick release connections 66. Quick release connections 66 may be any connections adapted to allow the automated sprayer to be quickly removed from the collapsible frame 14. Fluid pumped out of the automated sprayer 60, like water, soaps, chemicals, etc., may be provided by a pump 96 or plurality of pumps (see FIG. 18). The pumps 96 may be any known pumps or pumps developed in the future adapted for pumping water and cleaning fluids out of the automated sprayer 60. The movement of the automated sprayer 60 back and forth within the bay, and the pumping of the cleaning fluids may be controlled by a plurality of sensors and controls 98 (see FIG. 19). These sensors and controls 98 may be any known sensors and controls for operating an automatic carwash. The controls 98 may include, but is not limited to, a start button 100, a stop button 102, and a keyed power button 104.

In one embodiment, each of the sprayer tracks 64 may include a chain 68 or 70 in communication with a belt and pulley system 76 driven by a motor 72. See FIGS. 7-14. The motor 72 in combination with the belt and pulley system 76 and the chains 68 and 70 may be adapted to move the moveable cross-member 62 back and forth along the sprayer tracks. The motor 72 may be any motor capable of powering moveable cross-member 62 back and forth in carwash 10. Motor 72 may be in communicate with the chains 68 and 70 via the belt and pulley system 76. Each of the sprayer tracks 64 may have collapsible portion 78 in each of the collapsible length sections 28 of the collapsible frame. The collapsible portions 78 of the sprayer tracks 64 may include a left track 80 and a right track 82 pivotally connected together via the collapsible connection 84 (see FIG. 15). In one embodiment, each of the chains 68 and 70 may be covered with tubing sections as shown in the Figures.

The spring loaded tension sections 74 of sprayer track 64 may be included in each side of collapsible and transportable carwash 10. See FIGS. 12-14. Spring loaded tension sections 74 may be for providing tension in the respective side of left chain 68 or right chain 70. Spring loaded tension sections 74 may also allow for the additional length of chains 68 and 70 required for the collapse of the respective collapsible length sections 28. Spring loaded tension sections 74 may include any parts or combination of parts for providing tension in the chain and/or for allowing the additional length of chain required for the collapse of the collapsible length sections. In one embodiment, each of the spring loaded tension sections 74 may include a telescoping top 54 and telescoping bottom 56 of each side of the collapsible frame. In this embodiment, the spring may bias the telescoping bottom downwards thereby providing tension to the chain. The amount of tension in the chain may be adjusted by changing the spring or adjusting the tension of the spring.

In another embodiment, the automated carwash 10 of the instant invention may optionally include a removable roof 86. See FIGS. 1-3. The removable roof 86 may be for covering the carwash 10 and containing as much water as possible within the bay 12. Removable roof 86 may include any parts or combination of parts for covering carwash 10. In one embodiment, the removable roof 86 may include: a plurality of removable trusses 88 connected to the top 20 of the collapsible frame 14; and a cover 90 adapted to cover the top of the collapsible frame 14. The cover 90 may be further adapted to cover the sides of the collapsible frame 14 or at least a portion of the sides of the collapsible frame 14. The removable roof 86 being removable may allow the height of the carwash to be reduced, to allow the collapsible carwash to be transportable (i.e. it will fit under most bridges and overpasses on a standard utility trailer).

In another embodiment, the automated carwash 10 of the instant invention may optionally include a removable bottom 92. See FIGS. 1-2 and 4. The removable bottom 92 may be for covering the ground below the carwash 10 and retaining and collecting as much water as possible within the bay 12. Removable bottom 92 may include any parts or combination of parts for covering the ground below carwash 10. In one embodiment, the removable bottom 92 may include: a water collection tarp across the entire bottom of the collapsible frame 14 adapted to collect the water from the carwash 10; and a plurality of reservoirs 94 adapted to hold the water collected on the water collection tarp. The removable bottom 92 may be adapted to allow the automated carwash to recycle its water and may also contain the soap and/or chemicals used in the carwash within the carwash (i.e. no harmful soaps and/or chemicals may be leaked out into the environment).

The instant invention also includes a method of washing a car at a remote location via the collapsible and transportable automated carwash 10. The method of washing a car with carwash 10 may include any steps or processes for washing a car utilizing collapsible and transportable automated carwash 10. In one embodiment, the method of washing a car with carwash 10 may include the steps of: providing the collapsible and transportable automated carwash 10, as described herein, collapsing the collapsible and transportable automated carwash 10; transporting the collapsible and transportable automated carwash to a remote location inside a truck or on top of a standard utility trailer; removing the collapsible and transportable automated carwash from inside the truck or from on top of the standard utility trailer; expanding the collapsible and transportable automated carwash; and washing a car inside the collapsible and transportable automated carwash.

The present invention may be embodied in other forms without departing from the spirit and the essential attributes thereof, and, accordingly, reference should be made to the appended claims, rather than to the foregoing specification, as indicated the scope of the invention.

I claim:

1. A method of washing a car at a remote location via a collapsible and transportable automated carwash including the steps of:

providing a collapsible and transportable automated carwash comprising:
a bay with a collapsible frame including: a plurality of collapsible cross-members on the bottom and top of said frame connecting the left side of said collapsible frame to the right side of said collapsible frame, said plurality of collapsible cross-members allowing said collapsible frame to collapse and reduce the width of said carwash; a collapsible length section that collapses to reduce the length of said carwash, said collapsible length section including a telescoping top and bottom of each side of said collapsible frame, said collapsible length section locking into an extended position and a collapsed position via a plurality of collapsible length locks being selected from the group consisting of: pop out pins, insertable pins, screws, and combinations thereof, whereby, said automated carwash being collapsible and transportable; and
a removable bottom for said bay, said removable bottom comprising: a water collection tarp across the entire bottom of said collapsible frame collecting the water from said carwash; and a plurality of reservoirs holding the water collected on said water collection tarp; said removable bottom allowing said automated carwash to recycle water;

collapsing said collapsible and transportable automated carwash;

transporting said collapsible and transportable automated carwash to a remote location inside a truck or on top of a standard utility trailer;

removing said collapsible and transportable automated carwash from inside the truck or from on top of the standard utility trailer;

expanding said collapsible and transportable automated carwash; and washing a car inside said collapsible and transportable automated carwash.

2. The method of claim 1 wherein said carwash being collapsible enough to be transported on a standard 6 foot by 16 foot utility trailer.

3. The method of claim 1 whereby, said collapsible cross-members being in an extended position when one said cross-member being approximately 180 degrees to another said cross-member, and said collapsible cross-members being in a collapsed position when one said cross-member being less than 180 degrees to another said cross-member.

4. The method of claim 3 wherein each of said collapsible cross-members locking into said extended position via a plurality of cross-member locks being selected from the group consisting of: pop out pins, insertable pins, screws, and combinations thereof.

5. The method of claim 1 wherein said collapsible frame including two collapsible length sections, one collapsible length section on each end of said collapsible frame.

6. The method of claim 1 wherein said automated carwash further comprising an automated sprayer adapted to wash a car;
   said automated sprayer being connected to a moveable cross-member, said moveable cross-member being connected to the top of said collapsible frame on each side via a sprayer track on each side of said collapsible frame, said sprayer tracks allowing said moveable cross-member to move from one end of said collapsible frame to the other end of said collapsible frame;
   said automated sprayer being connected to said moveable cross-member by a plurality of quick release connections allowing said automated sprayer to be quickly removed from said collapsible frame;
   each of said sprayer tracks including a chain in communication with a motor for moving said moveable cross-member back and forth along said sprayer tracks; and
   each of said chains including a spring loaded tension section keeping constant tension on each of said chains.

7. The method of claim 6 wherein said motor communicating with said chain via a belt and pulley system.

8. The method of claim 6 wherein each of said sprayer tracks having a collapsible portion in each of said collapsible length sections of said collapsible frame;
   each of said collapsible portions of said sprayer tracks comprising a left track and a right track pivotally connected together via a collapsible connection.

9. The method of claim 1 wherein said automated carwash further including a removable roof, said removable roof comprising:
   a plurality of removable trusses connected to the top of said collapsible frame; and
   a cover for covering the top of said removable trusses.

10. The method of claim 9 wherein said cover being further for covering the sides of said collapsible frame or a portion of the sides of said collapsible frame.

* * * * *